March 1, 1966 R. A. GANGE 3,238,378

CRYOELECTRIC INDUCTIVE SWITCHING CIRCUITS

Filed May 17, 1962 4 Sheets-Sheet 1

PRIOR ART

INVENTOR.
ROBERT A. GANGE

BY Samuel Cohen

ATTORNEY

INVENTOR.
ROBERT A. GANGE
BY Samuel Cohen
ATTORNEY

March 1, 1966 R. A. GANGE 3,238,378

CRYOELECTRIC INDUCTIVE SWITCHING CIRCUITS

Filed May 17, 1962

4 Sheets-Sheet 3

INVENTOR.
ROBERT A. GANGE
BY Samuel Cohen
ATTORNEY

March 1, 1966 R. A. GANGE 3,238,378

CRYOELECTRIC INDUCTIVE SWITCHING CIRCUITS

Filed May 17, 1962 4 Sheets-Sheet 4

INVENTOR.
ROBERT A. GANGE

BY Samuel Cohen

ATTORNEY 3,238,378

CRYOELECTRIC INDUCTIVE SWITCHING CIRCUITS

Robert A. Gange, Skillman, N.J., assignor to Radio Corporation of America, a corporation of Delaware Filed May 17, 1962, Ser. No. 195,462

2 Claims. (Cl. 307—88.5)

This invention relates to cryoelectric circuits.

An object of the invention is to provide a cryoelectric electronically controllable inductor.

Another object of the invention is to provide a high speed cryoelectric switch.

Another object of the invention is to provide a high speed cryoelectric selection tree.

Another object of the invention is to provide an improved circuit for biasing a superconductor element in the intermediate state.

A circuit common to the circuits of the invention includes a first superconductor element closely adjacent to a second superconductor control element. A signal applied to the control element switches the latter between superconducting and non-superconducting (normal or intermediate) states and in this way radically changes the inductance of the first element. A number of such circuits may be interconnected to form a plurality of current paths extending between input terminal means and a plurality of output terminals. The inductance of the various paths may then be selectively changed in a manner to make all except a desired path (or paths) have a relatively high inductance. In this condition, a current applied to the input terminal means steers mainly into a desired path (or paths) in view of its (or their) lower inductance.

The invention is described in greater detail below and is illustrated in the following drawings of which:

Similar reference numerals are applied to similar circuit elements in the various figures.

Figure 1:
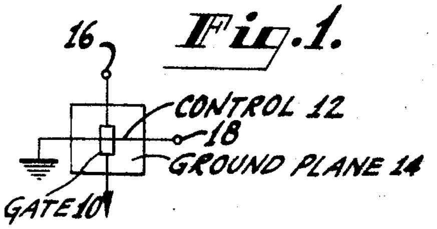
FIG. 1. PRIOR ART
FIG. 1 is a schematic showing of a prior art cryotron.

The cryotron of FIG. 1 includes a gate electrode 10 and a control electrode 12. Both electrodes may be in the form of thin films which are insulated from one another. The cryotron is located over a ground plane 14 which is insulated from electrodes 10 and 12.

In the operation of the cryotron, the gate electrode 10 may initially be in the superconducting state. In this condition, a drive current of insufficient magnitude to cause gate 10 to assume a normal state applied to input terminal 16 sees a low impedance path through the gate 10. If, however, a control pulse is applied to terminal 18, the magnetic field produced by the control pulse in the control electrode is of sufficient magnitude to drive the gate from its superconducting to its resistive (known in the art as its "normal") condition. When this occurs, the gate presents a finite resistance to the drive current applied to terminal 16.

Figure 2:
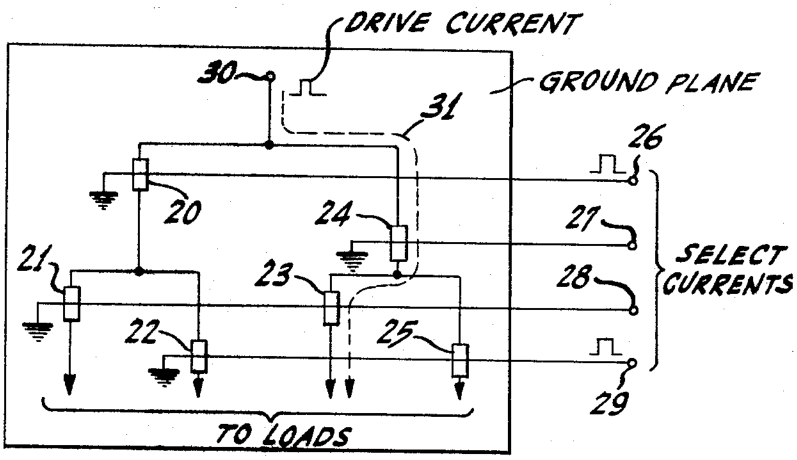
FIG. 2 is a schematic showing of a prior art cryotron selection tree.

A prior art selection tree employing cryotrons is shown in FIG. 2. While in practice there may be many more than four possible paths for the drive current, for the sake of drawing simplicity, only four such paths are shown. These paths lead to four different loads (not shown). In practice, the loads may be the $x$ or $y$ drive lines of a coincident current, superconducting memory, for example.

The selection tree of FIG. 2 includes six cryotrons 20–25, respectively. The desired one of the four paths for the drive current is selected by selection currents applied to certain ones of terminals 26–29, respectively.

In operation, assume that select current pulses are applied to terminals 26 and 29. These drive the cryotrons 20, 25 and 22 normal. Accordingly, the only path of the four paths which remains superconducting is the path containing cryotrons 24 and 23. If, during the time the select current pulses exist at terminals 26 and 29, a drive current pulse is applied to input terminal 30, it will steer into the superconducting path, since it has zero resistance, in preference to the other paths. This is indicated schematically by the dashed arrow 31.

Figure 3:
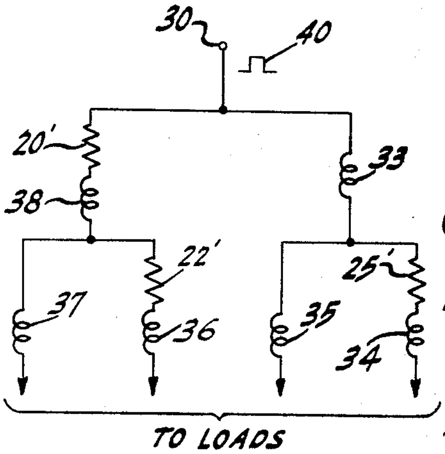
FIG. 3 is an equivalent circuit to help explain the operation of the circuit of FIG. 2.

While the above is, in a rough way, how a cryotron selection tree operates, additional factors must be considered in determining the ultimate speed capability of the tree. The speed is influenced by the time required for the select current pulse to drive the selected cryotrons normal and the time required for the drive current to follow the selected (the superconducting) path after the cryotrons have been driven normal. It may be assumed for the present that the time required to drive the cryotrons normal is zero. If, when the selected cryotrons are normal, the drive current pulse is applied to terminal 30, it "sees" a circuit such as shown schematically in FIG. 3. Each of the paths has an inductance associated with it. The inductors are represented in the figure at 33–38, respectively. As the paths are substantially identical, the values of inductances are substantially equal. The cryotrons 20, 25 and 22 are normal and they are represented in FIG. 3 by resistors 20', 22' and 25'.

Figure 4:
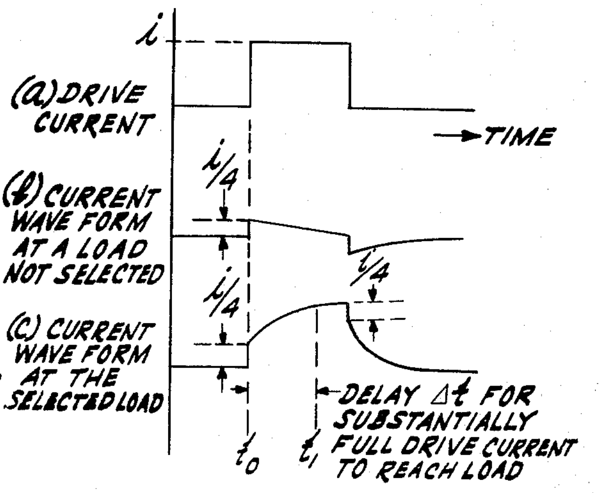
FIG. 4 is a drawing of waveforms, also to help explain the operation of the circuit of FIG. 2.

When the drive current pulse 40 is initially applied, its higher frequency components, that is, those components which together provide the steep leading edge, see mainly the inductance of each path. Therefore, there appears "instantaneously" at each of the four loads to which the four paths lead, a current having an amplitude one quarter that of the drive current. (The drive current waveform and current waveforms at the various loads are shown in FIG. 4.) Thereafter, due to the resistance in each of the non-selected paths, the current applied to the non-selected loads decays as indicated in FIG 4*b*. This current now steers instead into the selected superconducting path. (While not particularly important for purposes of this discussion, it can be shown that the current waveform delivered to the selected load is not a simple exponential but rather a wave made up of several exponentials added to one another.)

As can be seen at *c* in FIG. 4, there may be a considerable delay $\Delta t$ between time $t_0$ corresponding to the leading edge of the drive current and the time $t_1$ when substantially the full drive current is delivered to the load. As the selection tree becomes larger, the time delay $\Delta t$ increases. For example, in the case of a selection tree having 128 paths and loads of substantially equal impedance coupled to each path, the initial magnitude of current in the selected path is $i/128$ where $i$ is the amplitude of the drive current. The time required for the current at the selected load to reach substantially the full drive current amplitude is substantially longer than that of a four path tree because of the increased equivalent $L/R$ time constant of the larger selection tree. The equivalent $L/R$ time constant is a term made up of many distributed parameters and its calculation need not be discussed here. Suffice it to say, the calculated delay for a 128 path tree of certain configuration is about 5 to 6 microseconds.

Figures 5, 6, 7, 8:
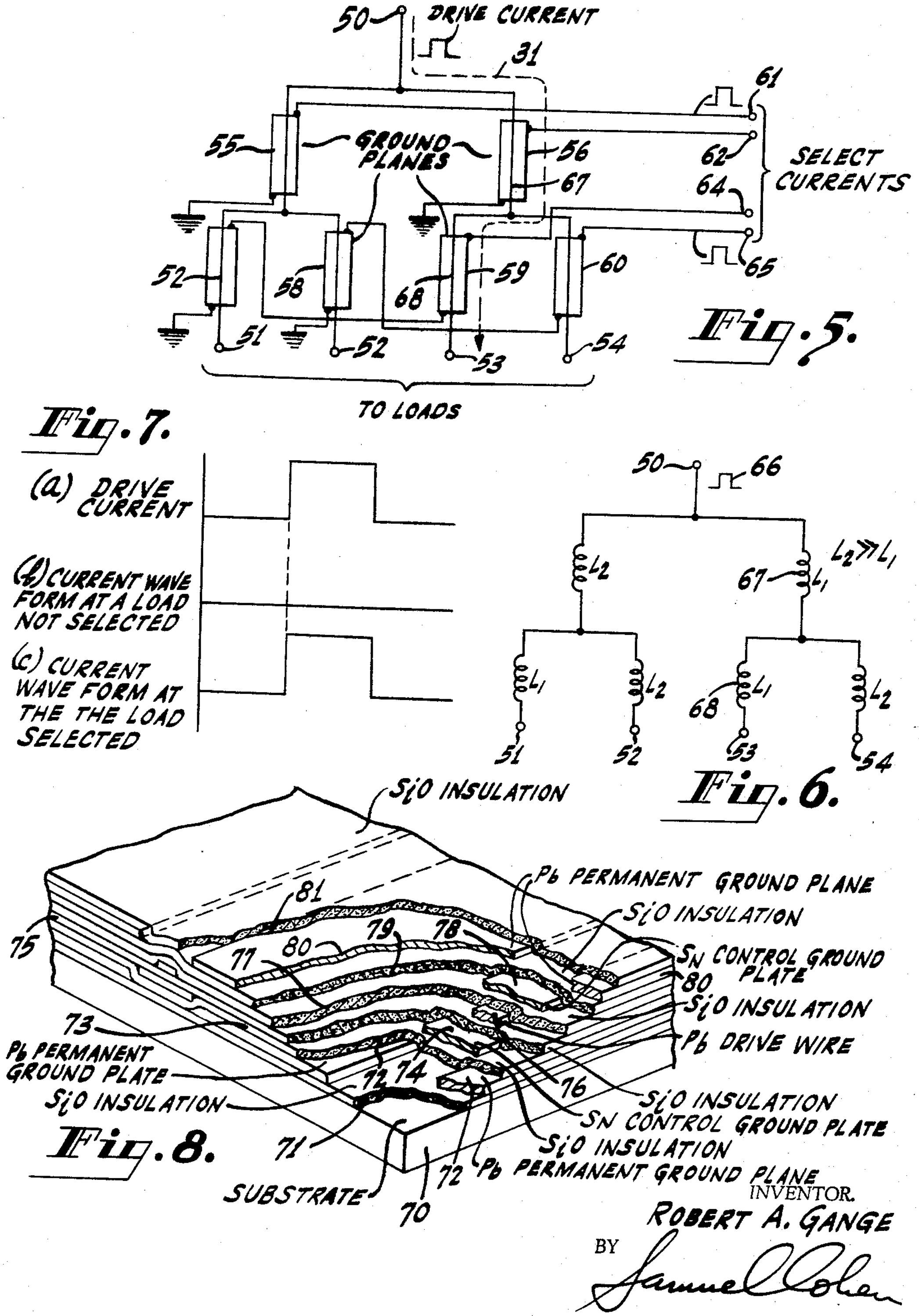
FIG. 5 is a schematic showing of a selection tree according to the present invention.
FIG. 6 is an equivalent circuit to help explain the operation of the circuit of FIG. 5.
FIG. 7 is a drawing of waveforms, also to help explain the operation of the circuit of FIG 5.
FIG. 8 is a partially cut-away view showing the construction of some of the elements of the selection tree of FIG. 5.

A selection tree according to the present invention is shown in FIG. 5. It includes a common input terminal 50 and a plurality of output terminals 51–54, respectively. The latter are coupled to loads of substantially equal value (not shown) such as the column or row wires of a superconductive memory. As in the case of the tree of FIG. 2, in practice, there may be many more than four current paths in a selection tree, however, the smaller tree shown is adequate for purposes of this explanation.

The various paths in the selection tree extending from the input terminal to the output terimnals are formed of a "hard" superconductive material such as lead. Superconductive shielding elements or ground planes are located immediately adjacent to the various branches making up the selection tree. Six such elements 55–60, respectively, are shown in FIG. 5. The shielding elements are preferably formed of a superconductive material, such as tin, which has a lower critical current than the material of which the selection tree branches (paths) are made. The state of the superconductive shielding elements is controlled by currents applied to the elements from control terminals 61, 62, 64 and 65, respectively.

The selection tree shown in FIG. 5 depends for its operation upon the principle that a shielded superconductive element has a substantially lower inductance than an unshielded superconductor element. A discussion of the effect of a superconductor ground plane on the inductance of a superconductive element may be found in an article by Slade, "Cryotron Characteristics and Circuit Applications," Proceedings of the IRE, September 1960, page 1569, and a second article in the same issue by C. R. Smallman, "Thin Film Cryotrons," at page 1562. The operation also depends upon the principle that a current applied to parallel superconductive paths divides into the paths in inverse proportion to the inductance exhibited by the paths.

According to the invention, the states of the superconductive elements located adjacent to the various branches are controlled in a manner that causes one path to have a much, much lower inductance than any other path. This causes substantially the entire current applied to the input terminal to steer into this path "instantaneously." For example, assume that path 67, 68 is the desired path. Current pulses are applied to control terminals 61 and 65 (FIG. 5). The pulses are of sufficient amplitude to drive the control ground planes 55, 60 and 58 out of their superconducting state. It may be assumed, for the present, that these planes are driven into the normal state, however, as will be explained in detail later, the control planes can be driven into the intermediate state instead. When the ground planes 55, 60 and 58 are driven out of the superconducting state, the inductance of the branches of the selection tree associated with these planes abruptly changes from a low value $L_1$ to a much higher value $L_2$, as illustrated schematically in FIG. 6.

If, during the time the control currents are applied, a drive current pulse 66 is applied to input terminal 50, the steep leading edge of that pulse sees in parallel a plurality of inductive paths. One of the paths, namely the one represented by inductors 67 and 68, has an inductance $L_1$ and which is much, much smaller than the inductance of any other path. The ratio $L_2/L_1$ of the inductances depends upon the geometry involved and may be $10^3$ or higher. Therefore, essentially the entire input current appears "immediately" at the output terminal 53. The remaining output terminals 51, 52 and 54 receive substantially no current. This is illustrated graphically in FIG. 7.

A partially cut away view of one element of a preferred form of selection tree, according to the present invention, appears in FIG. 8. The substrate 70 may be of glass or the like. The various layers making up the selection tree element may be applied through masks using vacuum deposition techniques. The lower layer 71 is an insulator such as silicon monoxide. This layer and the various others may be several thousand angstroms thick. The next layer may be a permanent ground plane 72 which always remains in the super-conducting state. There is next a second layer 73 of insulation and then the control ground plane 74. As previously mentioned, it is preferred that this plane be made of a superconductive material such as tin having a lower critical field than the material of which the drive wire is made. Preferably, the control ground plane slightly overlaps the edge of the permanent ground plane to provide very good shielding and therefore very low inductance for the drive wire when the control ground plane is in its superconducting state.

A third silicon monoxide layer 75 is located over the control ground plane 74. Next comes the drive wire 76 which is followed by a fourth insulation layer 77. A second control ground plane 78 may be laid down over the insulation layer 77. Next comes a fifth insulation layer 79 and finally a second permanent ground plane 80 and final insulation layer 81.

While the construction of FIG. 8 is preferred, other constructions are possible. For example, the permanent ground plane may be closer to the drive wire than the control ground plane. Also, the ground planes 80, 78 may be omitted entirely. In other words, the drive wire can have a ground plane only on one side thereof rather than the two sets of planes shown.

Figure 9:
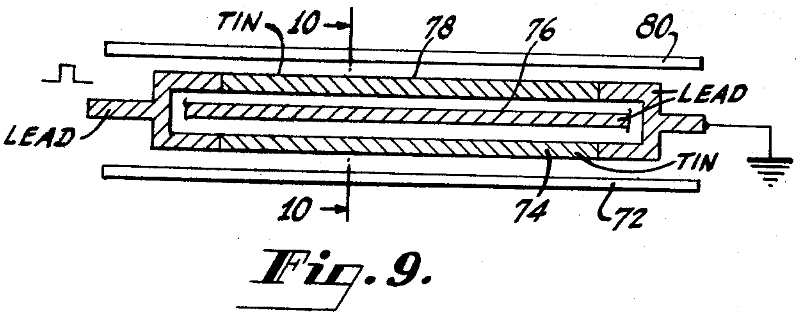
FIG. 9 is a cross-sectional view through one of the elements of the selection tree of FIG. 5. The insulation has been omitted from this figure and from FIG. 10 for the sake of drawing simplicity.
Figure 10:
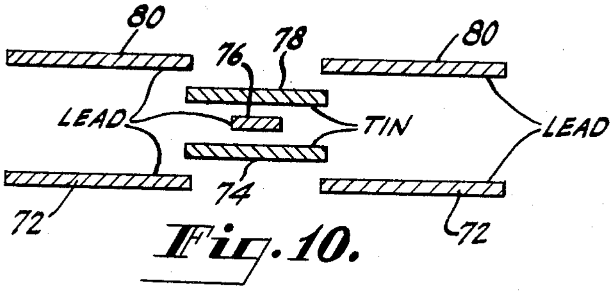
FIG. 10 is a cross-section along line 10—10 of FIG. 9.

FIGS. 9 and 10 show, in a somewhat more schematic way, the arrangement of the various elements in one branch of the selection tree. The insulation layers are omitted to simplify the drawing. The various elements of the branch have the same reference numerals applied as in the construction of FIG. 8.

Figure 15:
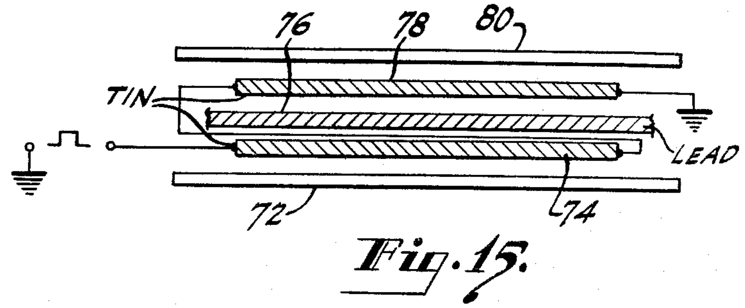
FIG. 15 is a cross-sectional view, similar to FIG. 9, but showing the two sections of the control ground plane connected in series rather than in parallel.

In the embodiment shown in FIGS. 9 and 10, the two control ground planes are connected in parallel. This is advantageous from the point of view of construction. However, the two control planes may instead be connected in series as shown in FIG. 15. This insures that the two control planes carry equal currents—an advantage from an electrical viewpoint as it lessens any tendency for spurious signals to be induced in the drive wire.

An important advantage of the selection tree of the present invention over the cryotron selection tree shown in FIG. 2 resides in the former's higher operating speed. In the prior art cryotron selection tree there may be a substantial time delay between the application of a drive current to the input terminal and the time at which a substantial portion of the drive current appears at the selected load. In the selection tree of the present invention, the drive current appears at the selected load with substantially zero delay, regardless of the number of paths.

In the prior art cryotron selection tree, the control electrodes always remain in the superconductive state and therefore substantially no power is required for the control lines. In the selection tree of the present invention, it requires power to drive the control ground planes out of their superconducting state. If the control ground planes are driven from their superconducting state into their normal state, the power required is relatively high. However, in a preferred form of the invention, rather than driving the control ground planes into their normal state they are instead driven only slightly into their intermediate state. In this condition, the ground planes do not act as a shield for the drive wires and therefore the inductance of these wires does increase in the manner discussed in detail previously. The advantage of driving the control ground planes into the intermediate rather than the normal state is that very little power is dissipated as the resistance $dR$ in the intermediate state may substantially lower than in the normal state.

Figure 11:
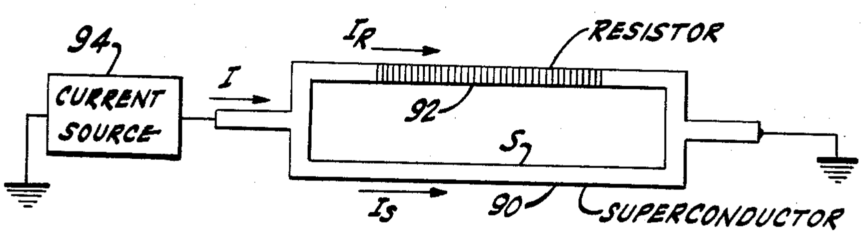
FIG. 11 is a schematic showing of a circuit for biasing a superconductor element so that it can operate in the intermediate state.

A way in which operation in the intermediate state can easily be achieved is shown in FIG. 11. The superconductor element, analogous to the ground plane, is shown at 90. A second element 92, which is resistive at the temperature at which element 90 is superconductive, and is preferably a non-superconducting material, is placed in shunt with the superconductor element 90. The current source 94 applies a current I to the two elements. It can be shown that for $\Delta I >> dI$, when $$I = I_c + \Delta I$$

that $$dR = \frac{\Delta I}{I_c} R$$

where $I$=the control current from source 94

$I_c$=critical current of superconductive branch 90. Critical current is defined as that value of current above which a superconductor element is driven out of its superconducting state.

$R$=the resistance of resistive branch 92

$dR$=the resistance of the superconducting branch 90 in its intermediate state, that is, at the operating point of the circuit of FIG. 11.

Figure 12:
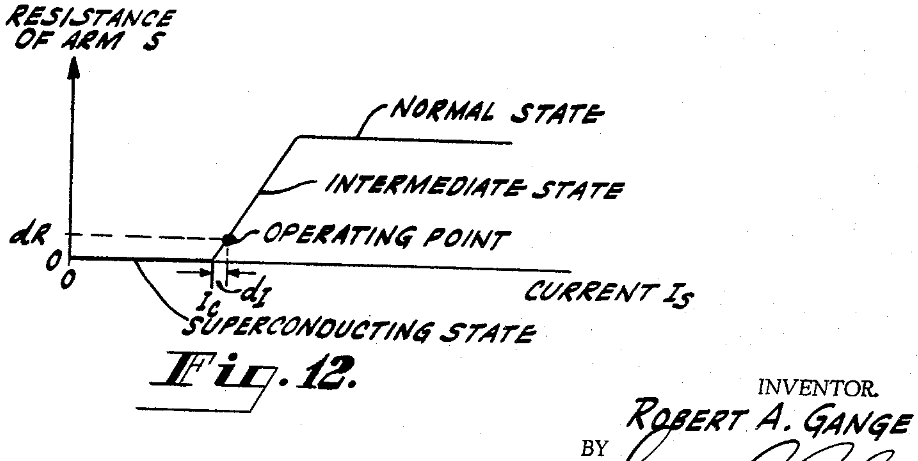
FIG. 12 is a curve of current versus resistance for the superconductor arm S of FIG. 11.

$\Delta I = dI + I_r$, where $dI$=the current passing through the superconductor, and $I_r$=the current passing through the resistor 92 (see FIG. 12).

The actual values of resistances and currents depend upon the size of the selection tree, the maximum power dissipation permissible and a number of other factors. However, in one particular application, $I_c$=100 ma., $\Delta I$=10, ma., $R=7\times10^{-3}$ ohms, $dR=7\times10^{-4}$ ohms. These figures are given by way of example only. It is to be understood that in other applications and for other materials they may vary.

Figure 13:
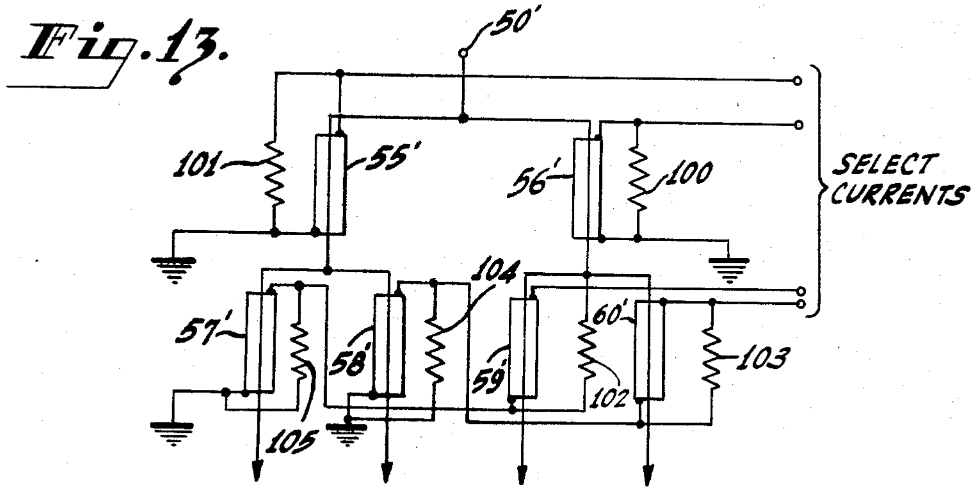
FIG. 13 is a schematic showing of a form of selection tree according to the present invention in which the superconductor shielding element is driven into the intermediate state.

A selection tree according to the present invention, in which the control ground planes are driven into their intermediate rather than normal state, is shown in FIG. 13. Elements similar in function and operation to the corresponding elements of FIG. 5 have the same reference numerals primed applied. The resistors are illustrated by conventional resistor symbols, however, in practice, they may be thin resistive films. Six resistors 100–105 are shown for six elements.

Figure 14:
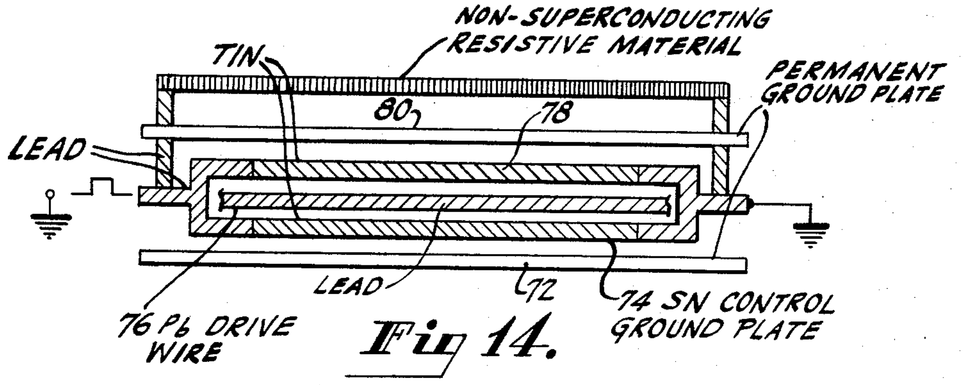
FIG. 14 is a view similar to the one of FIG. 9 of a branch of the tree of FIG. 13.

A schematic showing of one branch of the selection tree appears in FIG. 14. Elements corresponding in function to the elements of FIG. 9 have the same reference numerals applied.

The various embodiments of the invention discussed above all include a signal current carrying superconductor element (such as 67, FIG. 5) and a control ground plane element (such as 56, FIG. 5) adjacent to the signal current carrying element. The inductance of the latter may be abruptly increased by driving the control ground plane out of its superconducting state. In the embodiments of the invention discussed, this is accomplished by applying a current to the control ground plane. It should be appreciated that the invention is not limited to this means for controlling the state of the control ground plane. Other forms of energy may be used instead. For example, radiant energy rather than current may be used. This energy may be in the form of infra-red radiation, microwaves, sound, ultra-violet radiation light, X-rays, high energy particles and so on. Alternatively, a magnetic field or temperature rather than current may be employed. The control means may in the latter case be in the form of a heating element adjacent to the control ground plane.

What is claimed is:

1. An inductive switch comprising, a first superconductor current carrying element; a superconductor control ground plane arranged adjacent to the first superconductor element; a superconductor permanent ground plane always maintained in the superconductive state which is insulated from the control ground plane and extends slightly beyond the edges of the control ground plane, said control ground plane and permanent ground plane providing a shield for said first superconductor element; and means coupled to said control ground plane for driving the control ground plane from superconducting to non-superconducting states.

2. An inductive switch comprising, a first superconductor current carrying element; two superconductor control ground planes arranged adjacent to the first superconductor element, one on each side of said current carrying element; permanent superconductor ground planes always maintained in the superconductive state which are insulated from the control ground plane and slightly overlap and extend beyond the edges of the control ground plane, said control ground planes and permanent ground planes providing a shield for said first superconductor element; and terminals coupled to said control ground planes to which current may be applied for driving the control ground planes, in unison, from superconducting to normal states.

References Cited by the Examiner

UNITED STATES PATENTS

| | | | |
|---|---|---|---|
| 2,189,122 | 2/1940 | Andrews | 307—88.5 |
| 2,938,160 | 5/1960 | Steele | 307—88.5 |
| 2,946,030 | 7/1960 | Slade | 307—88.5 |
| 2,966,647 | 12/1960 | Lentz | 307—88.5 |
| 2,989,714 | 6/1961 | Park et al. | 307—88.5 |
| 3,007,057 | 10/1961 | Brennemann et al. | 307—88.5 |
| 3,020,489 | 2/1962 | Walker et al. | 307—88.5 |
| 3,022,468 | 2/1962 | Rosenberger et al. | 307—88.5 |
| 3,056,889 | 10/1962 | Nyberg | 307—88.5 |
| 3,065,359 | 11/1962 | Mackay | 307—88.5 |
| 3,098,967 | 7/1963 | Keck | 307—88.5 |

OTHER REFERENCES

"Superconductors" Symposium Proc. of Tech. session, published by John Wiley & Sons Inc., New York, edited by Tanenbaum et al., Feb. 18, 1962.

ARTHUR GAUSS, *Primary Examiner.*